United States Patent [19]

McElroy

[11] Patent Number: 5,053,618

[45] Date of Patent: Oct. 1, 1991

[54] INDEX TRACK SUPPORT STRUCTURE

[75] Inventor: Everett McElroy, Fallbrook, Calif.

[73] Assignee: Bei Electronics, Inc., San Francisco, Calif.

[21] Appl. No.: 502,567

[22] Filed: Mar. 30, 1990

[51] Int. Cl.$^5$ .............................................. G01D 5/34
[52] U.S. Cl. .............................................. 250/231.17
[58] Field of Search ................... 250/231.17, 231.16, 250/231.14, 231.13, 231.18, 237 G; 33/707; 341/13; 356/373, 375

[56] References Cited

U.S. PATENT DOCUMENTS

| | | | |
|---|---|---|---|
| 2,425,950 | 8/1947 | Morrison | 250/41.5 |
| 3,090,869 | 5/1963 | Astheimer | 250/203 |
| 3,307,039 | 2/1967 | Aemmer | 250/83.3 |
| 3,379,891 | 4/1968 | Aroyan | 250/233 |
| 3,757,128 | 9/1973 | Vermeulen | 250/237 G |
| 3,935,447 | 1/1976 | Black et al. | 250/233 |
| 3,995,156 | 11/1976 | Angersbach et al. | 250/231.17 |
| 4,072,861 | 2/1978 | Couderc et al. | 250/233 |
| 4,182,572 | 1/1980 | Humphrey | 356/127 |
| 4,476,457 | 10/1984 | Kondo | 250/231.16 |
| 4,602,155 | 7/1986 | LaPlante | 250/231 |
| 4,616,131 | 10/1986 | Burkhardt | 250/237 G |
| 4,678,908 | 7/1987 | LaPlante | 250/231 |
| 4,885,736 | 12/1989 | Horie | 369/275 |
| 4,965,446 | 10/1990 | Vyse | 250/231.17 |

*Primary Examiner*—David C. Nelms
*Assistant Examiner*—Michael Messinger
*Attorney, Agent, or Firm*—Limbach, Limbach & Sutton

[57] ABSTRACT

An optical code track supporting structure for providing position data about a moveable object. The encoder has an outside portion and an inside portion connected by a series of evenly spaced spokes which form a clear index track which allows substantially all of a light beam to be transmitted therethrough. The index track also has a single index element located therein which fully blocks the light beam for one brief pulse during one cycle of the moveable object.

4 Claims, 4 Drawing Sheets

INDEX TRACK SUPPORT STRUCTURE

BACKGROUND

1. Field of the Invention

The present invention relates generally to position encoders, and more specifically to code track structures for use in position encoders.

2. Discussion of the Prior Art

Optical encoders are typically used to provide positional information for rotating shafts. In a typical arrangement, the disk is attached to a rotating shaft. The disk includes code elements which are organized as data tracks to provide information about the angular position of the shaft. The code elements are positioned circumferentially on the disk. The disk can be opaque, while the code elements are generally transparent, or vice versa.

Adjacent to the rotating disk are detection circuits which are fixed with respect to the disk and used to read the code elements as they pass by the detection circuits. The detection circuits usually include a light source and photodetector, and sometimes a mask. The disk is positioned between a light source and a photodetector. A mask is sometimes used to set the aperture through which light passing through the code disk is examined by the photodetector. Typically, a mask will have a reverse image of the pattern sought to be detected. Registration is established between the mask and the pattern sought to be detected when the patterns on the code elements and mask match. At this point, light which is being transmitted from the source to the photodetector is blocked causing a low or zero light signal from the photodetector. When the disk and mask are out of registration, varying levels of light pass through the disk and mask on to the photodetector, thus generating a signal having a magnitude which indicates the amount of light incident upon the photodetector.

In incremental encoders, the detection means count the number of code elements which pass in registration when the disk is rotated with the shaft, so that the total number of elements counted from a reference point is proportional to the angular position through which the disk, hence the shaft, has been rotated.

In incremental encoders, the reference or index signal is usually generated by a different track, also arranged circumferentially on the disk, generally termed an index track.

In a typical arrangement, the index track is a single, circular path on the disk, separate from the data track(s), which is either entirely transparent or entirely opaque except for an single index mark positioned transversely across one point of the path. This mark totally blocks (in the case of a transparent path) or totally exposes (in the case of an opaque path) light to the photodetector to the light beam once per revolution of the code disk. In other words, once per revolution of the disk, the index track generates a step change pulse output signal, but the remainder of each revolution is otherwise steady at a constant level signal. In a variation on this technique, two index tracks are provided, one being opaque with a transparent mark, the other being transparent with a coincidental opaque mark to separate a differential index signal. See, for example, LaPlante, U.S. Pat. No. 4,602,155, issued July 22, 1986, and LaPlante, U.S. Pat. No. 4,678,908, issued July 7, 1987. In sophisticated systems, the index mark is generated using a pattern of elements or a sequence of patterns of elements to increase the certainty with which the index mark can be identified and detected. However, these approaches require large area detectors and more complex index tracks.

The method of constructing the type of optical encoders discussed above typically involves depositing a layer of opaque or reflective material on a transparent substrate base.

Another method for providing an index signal is to have a protrusion emanating from the outer periphery of the disk. However, such an arrangement is both fragile and dangerous.

For low cost encoders, it would be desirable to fabricate the code disk out of metal, with the code elements for data and index tracks being formed by electroforming, depositing, etching or stamping clear through the metal. However, when an index track is desired having an opaque index mark with the rest of the track being clear, the formation of the clear portion of the track would result in removal of structural support for the outer, code track supporting portions of the disk.

SUMMARY OF THE INVENTION

A code disk suitable for use in an optical encoder is disclosed. The disk is couplable for movement with a moveable object for providing data about the position of the moveable object. It includes an index track, an outside opaque portion, an inside opaque portion, and a plurality of spaced-apart spokes connecting the outside portion to the inside portion. A space between the outside and inside portions forms the index track. The spokes have a predetermined width and are angled across the index track such that when a light beam is transmitted through the index track in a generally perpendicular direction, the light beam is minimally blocked by the spokes.

It is, therefore, an object of the present invention to provide an improved optical encoder capable of low cost construction wherein an index signal is generated by focusing a light source through an index track, the index track being basically an empty space between the inner portion of the disk and the outer portion of the disk which includes a support structure to maintain support of the outer portion of the disk from the inner portion of the disk.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
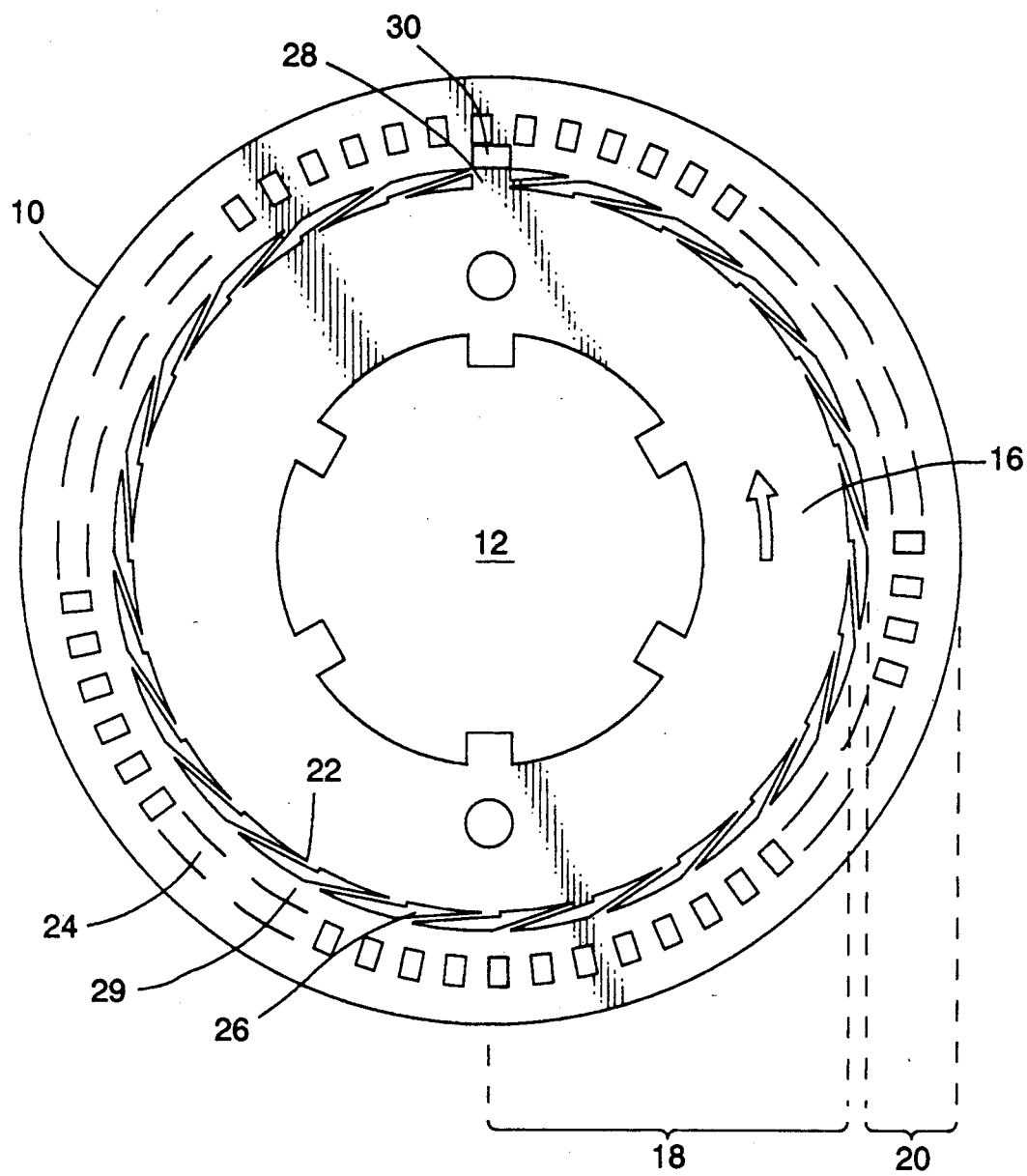
FIG. 1 illustrates an optical encoder disk having an index track arrangement in accordance with the present invention.
Figure 2:
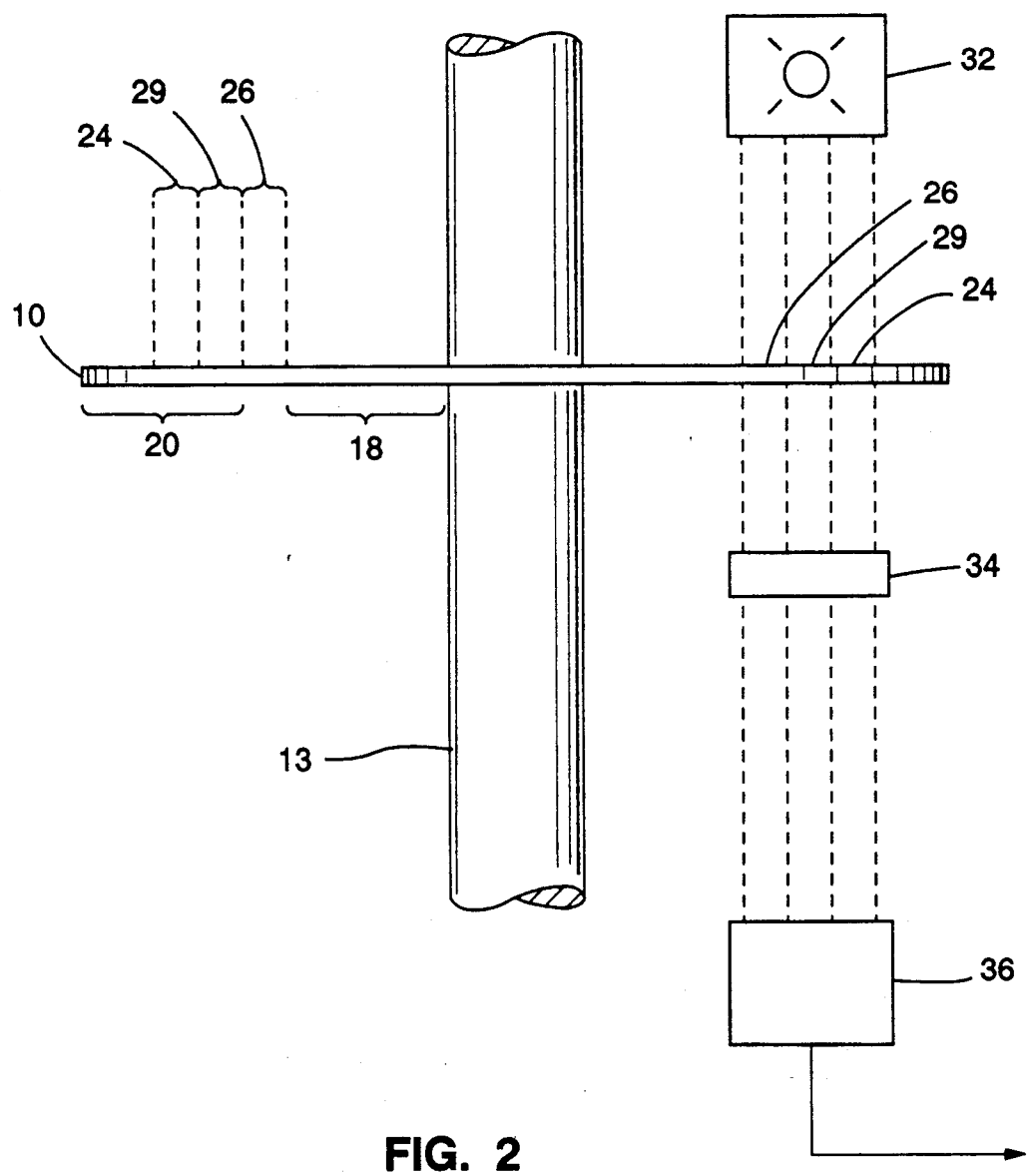
FIGS. 2 and 2a illustrate the interaction of detecting means with the code disk of FIG. 1.

Referring now to FIGS. 1 and 2, an optical encoder according to the present invention is shown. The embodiment shown is in the form of a circular disk 10 having a center opening 12 through which a rotating shaft 13 is passed. The disk 10 is typically coupled to the shaft by means of conventional fittings (not shown). The direction of rotation is indicated by arrow 16.

The disk 10 has an inside portion 18 and an outside portion 20 which are connected to one another by a series of spokes 22. The outside portion 20 is a solid piece of opaque material, such as metal. A data track 24 can be formed in portion 20 which is made up of a series of identical openings which may be electroformed, deposited, etched, or stamped in the disk. Thus, as the disk 10 rotates, the data track 24, viewed from a single reference point, provides an alternating series of opaque and transparent surfaces.

The spokes 22 provide structural support for the outer portion 20 as well as form a virtually transparent first index track 26 between the outer portion 20 and inner portion 18. The spokes 22 are angled such that they minimally block a light beam from source 32. On the detector side of the disk, light which is permitted to pass through the index track 26 is incident on photodetector 36. Detector 36 has an aperture which is defined by mask 34. Mask 34 has a clear portion which is the mirror image of index element 28. Index element 28 is also located within the first index track, but is orientated in the radial direction, such that light from source 32 will be blocked by index element 28. Index element 28 thus provides the reference point from which angular rotation is measured. In the embodiment shown, a second index track 29 is located on the outside portion 20 between the data track 24 and the first index track 26, but this track is totally opaque except for index element 30 which is transparent as a result of electroforming, depositing, etching or stamping the disk 10 to permit the passage of light. It is to be understood that second track 20 is not necessary to practice the invention.

Figure 2A:
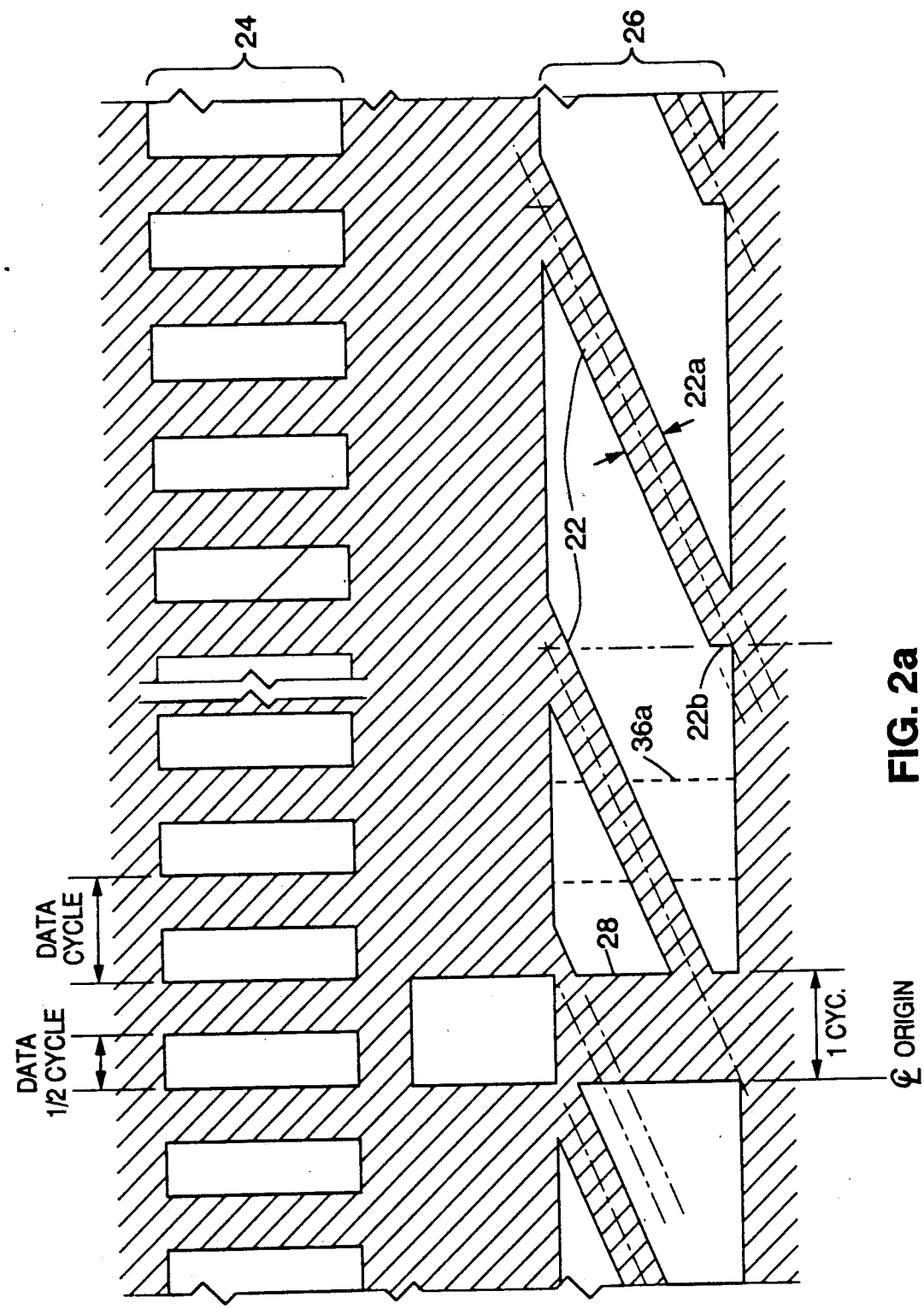

As shown in FIG. 2, a light source 32, mask 34, and detector 36 are aligned on a perpendicular axis to the disk 10 in a position corresponding to area from the first index track 26 to the outside edge of the disk 10. The mask has a pattern which corresponds to that of the data track 24 and the index element 28. The photodetector has a portion which detects light from the index track 26 and another portion which detects light from the data track 24. FIG. 2a shows index track 26 as it passes over the aperture 36a of detector 36. When the spoked-portion of index track 26 passes over aperture 36a, it can be seen that, at any instant in time, only a small portion of the aperture 36a is blocked such that substantially all of the light from light source 32 is transmitted onto photodetector 36. As such, a high level DC signal is generated by detector 36, albeit a slightly lower signal due to the partial blocking created by spokes 22. On the other hand, when index- element 28 passes over aperture 26, the transmitted light is substantially blocked. This forms an index signal once per revolution, thus providing a reference point from which angular displacement can be measured. The second index track 29 likewise generates a low level signal until interrupted by a high level pulse as a result of index element 30.

Figure 3:
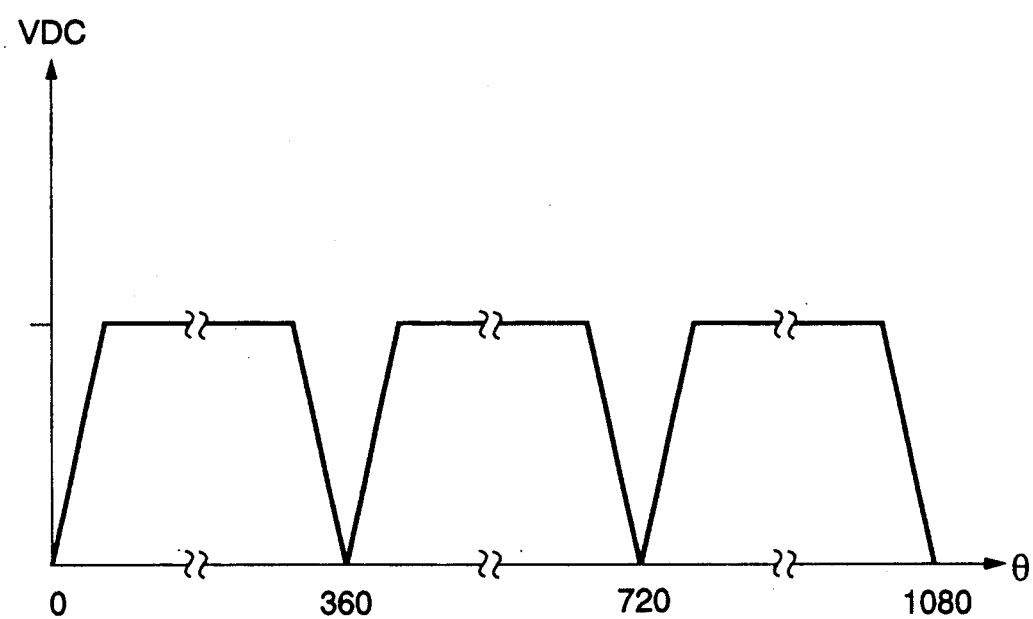
FIG. 3 is a plot of detector signal intensity versus angular displacement.

These results are shown in the graph of FIG. 3. When index element 28 is positioned directly between detector 36 and source 32, no light is received by the detector and its output signal is a low level signal, such as 0 VDC, thus providing a reference point from which angular displacement can be measured. As the disk 10 rotates, detector 36 is only partially blocked by each spoke 22 due to the spokes' angular positioning. Thus, through each revolution of the disk 10, the index track 26 acts virtually transparent such that a high level DC signal is generated.

In the preferred embodiment of the present invention, the disk is formed of metal such as beryllium-copper or stainless steel and is chemically etched, stamped, electroformed, or deposited. Spokes 22 preferably are arranged so that as one moves circumferentially along the index track a new spoke begins just as the current spoke ends. In this manner, the clear track output of the photodetector is DC or near DC. In the embodiment shown in the figures, the index element has a nominal circumferential width of one data cycle, and the index track has a radial width of 0.034 inches. The radial distance to the index track is 0.514 inches. The spokes 22 are preferably angled at fourteen degrees, tangential to the track, and have a nominal width 22a of 0.010 inches. With these values of resolution, 24 spokes are located circumferentially beginning every 15 degrees within the index track 26. The spokes 22 overlap slightly, but the leading edge 22b of each spoke is truncated to avoid additional blockage of aperture 36a. Please note that the above dimensions are determined by diameter and resolution. Various disk diameters and/or resolutions may and will be used which will affect the dimensions noted.

While the present invention has been described in terms of an angular optical encoder, it is equally applicable to lineal encoders.

It should be understood that the invention is not intended to be limited by the specifics of the above-described embodiment, but rather defined by the accompanying claims.

I claim:

1. A structure for an optical position encoding device, wherein the structure is capable of being coupled for movement with a moveable object, and wherein the structure carries a plurality of tracks, including an index track, and wherein the tracks modulate a light beam being transmitted from a light source to a photodetector in order to provide information about the movement of the moveable object, the structure comprising:
    a. an outside opaque portion;
    b. an inside opaque portion;
    c. a plurality of spaced-apart spokes mechanically supporting the outside portion from the inside portion and forming a region between the outside and inside portions, wherein the region occupied by the spokes forms the index track; and
    d. an index element located within said index track; wherein said index element has a width sufficient to substantially block the transmission of the light beam onto the photodetector when the index element passes over the photodetector, and wherein said spokes have a width which allows substantially all of the light beam to be transmitted through the index track and onto the photodetector.

2. The optical code track supporting structure of claim 1, wherein said structure is a circular disk and wherein said inside portion, index track, and outside portion are circumferentially located at respectively increasing radial portions on said disk.

3. The optical code track supporting structure of claim 2, wherein said spokes are positioned at a predetermined angle relative to the tangent of the index track.

4. The optical code track supporting structure of claim 3, wherein said angle is approximately fourteen degrees.

* * * * *